June 2, 1964 R. B. JENISON 3,135,035
SAFETY PIN

Filed Jan. 5, 1962

INVENTOR.
RICHARD B. JENISON
BY
Max Schwartz
ATTORNEY

3,135,035
SAFETY PIN
Richard B. Jenison, 48 Hill Top Drive, Cranston, R.I.
Filed Jan. 5, 1962, Ser. No. 164,518
4 Claims. (Cl. 24—161)

My present invention relates to fastening devices and more particularly to a novel construction of a safety pin.

The principal object of the present invention is to provide a safety pin which remains in locked position at all times until positively opened.

Another object of the present invention is to provide a safety pin in which the resiliency of the pin tends to retain it in closed position.

A further object of the present invention is to provide a safety pin having a positive locking arrangement for releasably locking the pin in closed position.

Another object of the present invention is to provide a safety pin which is simple in construction and easy and economical to manufacture and assemble.

With the above and other objects and advantageous features in view my invention consists of a novel arrangement of parts more fully disclosed in the detailed description following in conjunction with the accompanying drawings and more particularly defined in the appended claims.

Safety pins are generally used for diapers and other baby garments. The conventional safety pin comprises a resilient wire body portion and a cowl or head into which the pointed free end is pressed to close the pin. The natural resiliency of such pins is to remain in open position with no provision for positive locking while in closed position. The present invention is designed to provide a pin in which the natural resiliency tends to retain the pin in closed position with additional locking means being provided in the head to provide a completely and safely secured pin.

Figure 1:
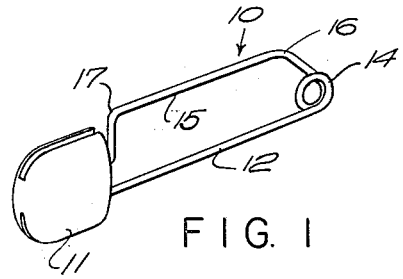
FIG. 1 is a perspective view of a safety pin embodying my invention.
Figure 2:
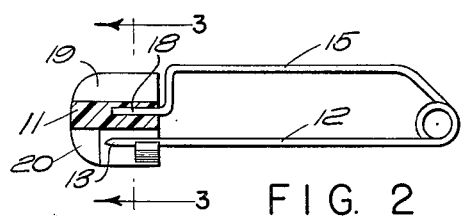
FIG. 2 is a side elevation thereof with the head in section.

Referring more in detail to the drawings, the pin of the present invention comprises a resilient wire body portion 10 and an integral one-piece cowl or head 11. The body portion 10 preferably comprises a straight portion 12 having a pointed end 13 connected through a loop 14 to the fixed arm 15. The arm 15 is bent at 16 and 17 to space it from the straight arm 12 and is provided with a free end 18 which is imbedded in the head 11 as shown in FIG. 2. The resiliency of the body portion 10 is so constructed that the arms 12 and 15 are at rest in the position shown in FIGS. 1 and 2 and it requires a pull sufficient to overcome the resiliency of the wire to move the arms 12 and 15 apart.

Figure 3:
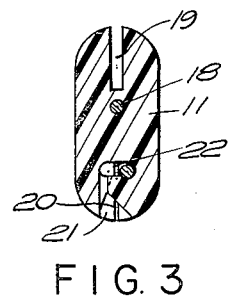
FIG. 3 is an enlarged section taken on line 3—3 on FIG. 2.

The head 11 is preferably molded in one piece from resilient plastic material. The end 18 of the arm 15 is imbedded in approximately the center of the head 11. Extending rearwardly from a point slightly spaced from the end 18 is a slot 19 extending to the rear of the head. Forwardly of the imbedded portion 18 is a slot 20 having a wide entranceway 21 leading to the circuitous passageway 22 which provides a small chamber to one side of the axis as shown in FIG. 3. When the pointed arm 12 is pressed against the passageway opening 21 it frictionally squeezes through the passageway 20 and around into the portion 22 where it is locked against removal. Note that in the postion shown in FIGS. 2, 3 and 4, the arm 12 is at rest and resiliently resists any movement tending to open the pin and move the pointed end out of the head. In addition an examination of FIG. 3 shows that the passageway 20 is closed at right angles and does not permit the passage of the pin point 13 without a very considerable effort. Thus with the pin in the position shown in the drawings there is practically no likelihood of the child accidentally opening the pin or of swallowing an open pin.

The slot 19 permits the head 11 to be pinched at this point and the pressure thus applied rocks the head of resilient plastic so that as the rear portion is pinched together the front portion including the slot 20 is spread slightly apart to permit the removal of the end 13 of the pin. In closing the pin it will not be necessary to pinch it since the end 13 will easily slide along the tapered walls 21 into locking position.

Figure 4:
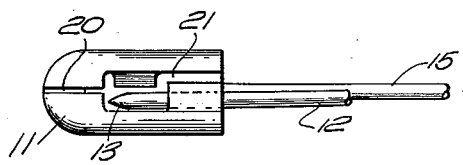
FIG. 4 is an enlarged front view of the head.
Figure 5:
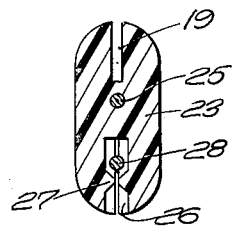
FIG. 5 is a view similar to FIG. 3 showing an alternative construction.

The construction shown in FIGS. 2, 3 and 4 provides a firm and positive lock. FIG. 5 illustrates an alternative construction of somewhat simpler form. In this form the head 23 is provided with a rear slot or cut out portion 24 extending close to the imbedded end 25 of the pin. At the forward end the slot 26 is merely provided with indented portions 27 intermediate the ends of the slot forming a restricted slot portion. At rest the movable free end of the pin 28 is normally within the slot 26. To open the pin it is necessary to snap it past the portions 27 and similarly to close the pin it must be snapped past the portions 27. Thus the restricted slot acts as a friction guard to retain the pin in closed position.

I have thus provided a safety pin in which the natural resiliency of the pin body retains the pin in closed position at rest. In addition, positive closure means are provided in the head to lock the pin in closed position. Other advantages of the present invention will be readily apparent to a person skilled in the art.

I claim:

1. A safety pin comprising an elongated frame formed from a single piece of resilient wire, said wire forming spaced parallel legs connected at one end by at least one complete loop, one end terminating in a sharp point, and a cowl mounted on the other end and having means for releasably locking said sharp end within said cowl, said cowl having a sharp end receiving slot extending inwardly from one side edge, and a second slot extending inwardly from the opposite side edge, the portion of said cowl between said slots being resilient and normally biasing said sharp end receiving slot into closed position, whereby squeezing of said second slot causes opening of said end receiving slot, the portion of said cowl between said slots being resilient and normally biasing said sharp end receiving slot into closed position.

2. A safety pin comprising an elongated frame formed from a single piece of resilient wire, said wire forming spaced parallel legs connected at one end by at least one complete loop, one end terminating in a sharp point, and a cowl mounted on the other end and having means for releasably locking said sharp end within said cowl, said cowl having a sharp end receiving slot extending inwardly from said one side edge, and a second slot extending inwardly from the opposite side edge, the portion of said cowl between said slots being resilient and normally biasing said sharp end receiving slot into closed position, whereby squeezing of said second slot causes opening of said end receiving slot, said legs being spring biased to normally position said sharp end within said cowl, the portion of said cowl between said slots being resilient and normally biasing said sharp end receiving slot into closed position.

3. A safety pin comprising an elongated frame formed from a single piece of resilient wire, said wire forming spaced parallel legs connected at one end by at least one complete loop, one end terminating in a sharp point, and a cowl mounted on the other end and having means for releasably locking said sharp end within said cowl, said cowl comprising plastic material molded to the other end of said wire, said cowl having a sharp end receiving slot extending inwardly from one side edge, and a second slot extending inwardly from the opposite side edge, the portion of said cowl between said slots being resilient and normally biasing said sharp end receiving slot into closed position, whereby squeezing of said second slot causes opening of said end receiving slot, the portion of said cowl between said slots being resilient and normally biasing said sharp end receiving slot into closed position.

4. A safety pin comprising an elongated frame formed from a single piece of resilient wire, said wire forming spaced parallel legs connected at one end by at least one complete loop, one end terminating in a sharp point, and a cowl mounted on the other end and having means for releasably locking said sharp end within said cowl, said cowl having a sharp end receiving slot extending inwardly from one side edge, and a second slot extending inwardly from the opposite side edge, the portion of said cowl between said slots being resilient and normally biasing said sharp end receiving slot into closed position, whereby squeezing of said second slot causes opening of said end receiving slot, said locking means including a restricted slot construction for locking said sharp end within said cowl, the portion of said cowl between said slots being resilient and normally biasing said sharp end receiving slot into closed position.

References Cited in the file of this patent

UNITED STATES PATENTS

| | | |
|---|---|---|
| 1,315,755 | Bogdahn | Sept. 9, 1919 |
| 2,084,480 | Crandall | June 22, 1937 |
| 2,157,433 | Porter | May 9, 1939 |
| 2,551,063 | Sneirson | May 1, 1951 |
| 2,783,515 | Tobias | Mar. 5, 1957 |
| 2,887,748 | Heyden | May 26, 1959 |
| 3,001,259 | Scheemaeker | Sept. 26, 1961 |
| 3,043,902 | Klein | July 10, 1962 |

FOREIGN PATENTS

| | | |
|---|---|---|
| 688,260 | Great Britain | Mar. 4, 1953 |